(12) United States Patent
Jeong et al.

(10) Patent No.: US 8,390,983 B2
(45) Date of Patent: *Mar. 5, 2013

(54) MULTILAYER CERAMIC CAPACITOR

(75) Inventors: Ji Hun Jeong, Gyunggi-do (KR); Hyo Jung Kim, Gyunggi-do (KR); Dong Ik Chang, Gyunggi-do (KR); Doo Young Kim, Gyunggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 269 days.

This patent is subject to a terminal disclaimer.

(21) Appl. No.: 12/766,161

(22) Filed: Apr. 23, 2010

(65) Prior Publication Data

US 2011/0141660 A1 Jun. 16, 2011

(30) Foreign Application Priority Data

Dec. 10, 2009 (KR) ........................ 10-2009-0122198

(51) Int. Cl.
*H01G 4/06* (2006.01)
*C04B 35/00* (2006.01)
(52) U.S. Cl. ........................ 361/311; 501/137
(58) Field of Classification Search .... 361/321.1–321.5, 361/311; 501/137–139
See application file for complete search history.

(56) References Cited

U.S. PATENT DOCUMENTS

| 2002/0055571 | A1 | 5/2002 | Hirano et al. |
| 2010/0201473 | A1 | 8/2010 | Konoue et al. |
| 2011/0141655 | A1* | 6/2011 | Jeong et al. ............. 361/303 |

FOREIGN PATENT DOCUMENTS

JP 59114704 A * 7/1984

(Continued)

OTHER PUBLICATIONS

Japanese Office Action, w/ English translation thereof, issued in Japanese Patent Application No. JP 2010-107540 dated Dec. 20, 2011.

(Continued)

*Primary Examiner* — Eric Thomas
(74) *Attorney, Agent, or Firm* — McDermott Will & Emery LLP

(57) ABSTRACT

Disclosed is a multilayer ceramic capacitor. The multilayer ceramic capacitor includes a capacitive part including a plurality of dielectric layers and first and second internal electrodes that are laminated in an alternating manner, wherein one set of ends of the first internal electrodes and the other set of ends of the second internal electrodes are exposed in a lamination direction in which the dielectric layers are laminated, a protective layer formed on at least one of top and bottom surfaces of the capacitive part, including a plurality of pores having an average pore size of 0.5 μm to 3 μm, and having a porosity of 2% to 10%, and first and second external electrodes electrically connected to the first and second internal electrodes exposed in the lamination direction of the dielectric layers.

5 Claims, 2 Drawing Sheets

FOREIGN PATENT DOCUMENTS

| | | |
|---|---|---|
| JP | 09-129487 | 5/1997 |
| JP | 11-067575 | 3/1999 |
| JP | 2000-114098 | 4/2000 |
| JP | 2002-255655 | 9/2002 |
| JP | 2002-289433 A | 10/2002 |
| JP | 2003-309039 | 10/2003 |
| JP | 2005-159056 | 6/2005 |
| JP | 2007-142342 | 6/2007 |
| JP | 2007173480 A * | 7/2007 |
| JP | 2007-266223 | 10/2007 |
| WO | WO 2009/034824 A1 | 3/2009 |

OTHER PUBLICATIONS

Korean Office Action, w/ English translation thereof, issued in Korean Patent Application No. KR 10-2009-0122198 dated Mar. 29, 2011.

Korean Office Action, w/ English translation thereof, issued in Korean Patent Application No. 10-2009-0122198, dated Sep. 29, 2011.

Japanese Office Action, and English translation thereof, issued in Japanese Patent Application No. 2010-107540 dated May 22, 2012.

* cited by examiner

MULTILAYER CERAMIC CAPACITOR

CROSS-REFERENCE TO RELATED APPLICATIONS

This application claims the priority of Korean Patent Application No. 10-2009-0122198 filed on Dec. 10, 2009, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor having a high level of reliability and a low crack occurrence rate by reducing stress acting on the multilayer ceramic capacitor.

2. Description of the Related Art

In general, electronic components using a ceramic material, such as capacitors, inductors, piezoelectric devices, varistors or thermistors, include a ceramic body formed of a ceramic material, internal electrodes provided inside the ceramic body, and external electrodes installed on the surface of the ceramic body.

Multilayer ceramic capacitors among such ceramic electronic components include a plurality of laminated dielectric layers, internal electrodes interleaved with the dielectric layers, and external electrodes electrically connected to the internal electrodes.

Multilayer ceramic capacitors are being widely used as a part of mobile communications devices, such as computers, personal digital assistants (PDA) and mobile phones, due to their small size, high capacity and ease of mounting.

Recently, as electronic products have become compact and multi-functional, chip components have also tended to become compact and highly functional. Following this trend, a multilayer ceramic capacitor is required to be smaller than ever before, but to have a high capacity.

As for a general method of manufacturing a multilayer ceramic capacitor, ceramic green sheets are manufactured and a conductive paste is printed on the ceramic green sheets to thereby form internal electrode layers. Tens to hundreds of such ceramic green sheets, provided with the internal electrode layers, are then laminated to thereby produce a green ceramic laminate. Thereafter, the green ceramic laminate is pressed at high pressure and high temperature and subsequently cut into green chips. Thereafter, the green chip is subjected to plasticizing, firing and polishing processes, and external electrodes are then formed thereon, thereby completing a multilayer ceramic capacitor.

Typically, the internal electrodes, formed of metal, shrink and expand easily as compared to ceramic materials. Thus, stress caused by this difference in thermal expansion coefficient may act on the ceramic laminate, thereby causing cracks.

The multilayer ceramic capacitor is used while mounted on a wiring board. In this case, the external electrodes of the multilayer ceramic capacitor are electrically connected to the wiring board by soldering and a conductive land on the wiring board. When the multilayer ceramic capacitor is mounted on the wiring board by using soldering, or when the wiring board mounted with the multilayer ceramic capacitor undergoes a cutting process, thermal impact and shear stress are applied to the multilayer ceramic capacitor. Such thermal impact and shear stress may cause cracks in the multilayer ceramic capacitor.

As the multilayer ceramic capacitor has recently become smaller in size and higher in capacitance, many attempts have been made to manufacture a thinner and multilayer ceramic body. However, as the ceramic body has become thinner and multilayered, a crack occurrence rate has increased. Therefore, there is an increasing need for preventing this increase in the crack occurrence rate therein.

SUMMARY OF THE INVENTION

An aspect of the present invention provides a multilayer ceramic capacitor having a high level of reliability and a low crack occurrence rate by reducing stress acting on the multilayer ceramic capacitor.

According to an aspect of the present invention, there is provided a multilayer ceramic capacitor including: a capacitive part including a plurality of dielectric layers and first and second internal electrodes that are laminated in an alternating manner, wherein one set of ends of the first internal electrodes and the other set of ends of the second internal electrodes are exposed in a lamination direction in which the dielectric layers are laminated; a protective layer formed on at least one of top and bottom surfaces of the capacitive part, including a plurality of pores having an average pore size of 0.5 μm to 3 μm, and having a porosity of 2% to 10%; and first and second external electrodes electrically connected to the first and second internal electrodes exposed in the lamination direction of the dielectric layers.

The protective layer may include barium titanate (BaTiO$_3$)-based ceramic particles, lead complex perovskite-based ceramic particles, or strontium titanate (SrTiO$_3$)-based ceramic particles.

The protective layer may include ceramic particles having an average particle size of 0.1 μm to 0.3 μm.

The capacitive part may have a porosity of 1% or less.

The capacitive part may have a thickness of 50 μm to 2000 μm, and the protective layer may have a thickness of 10 μm to 100 μm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
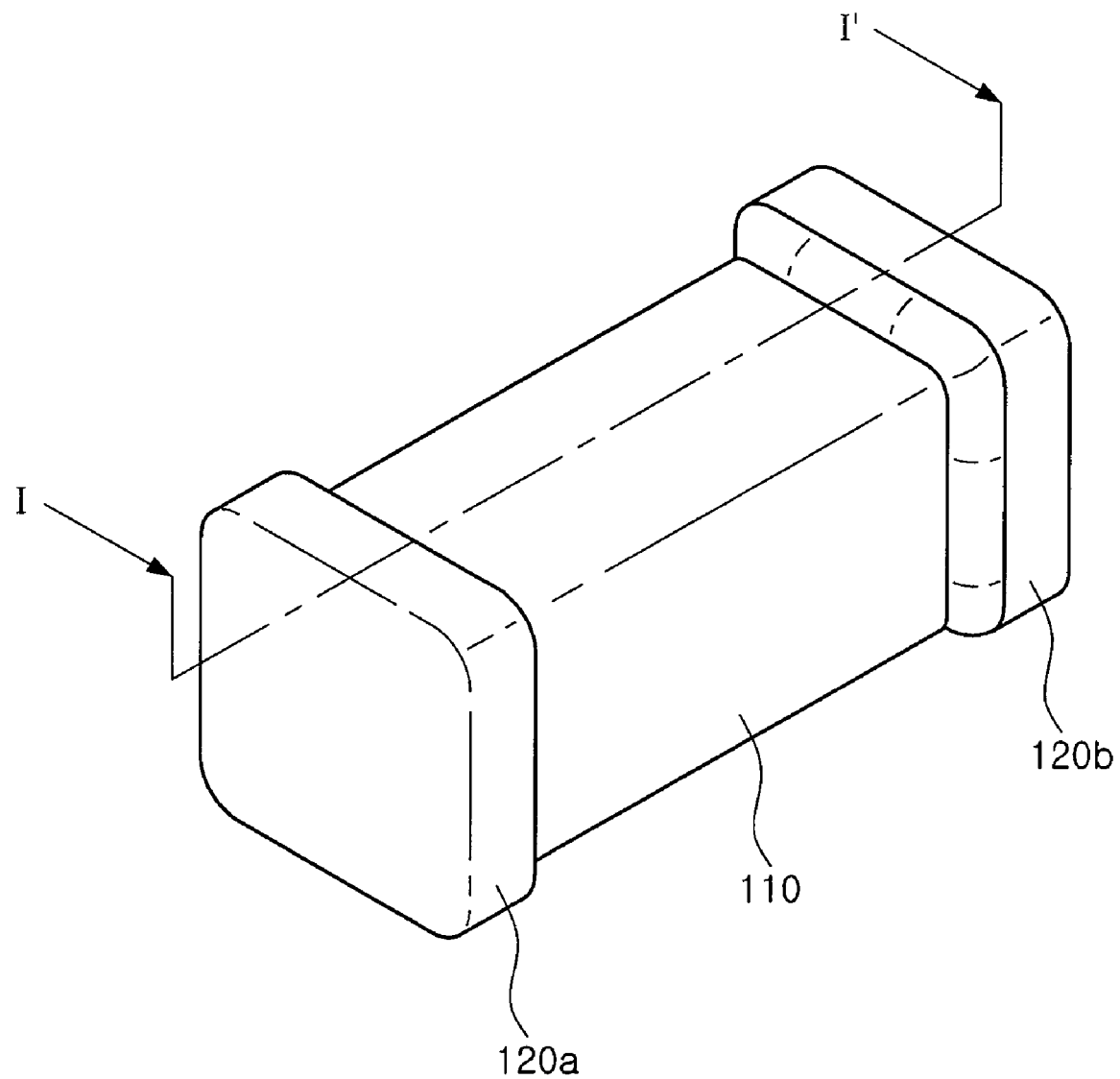
FIG. 1 is a schematic perspective view illustrating a multilayer ceramic capacitor according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements.

Figure 2:
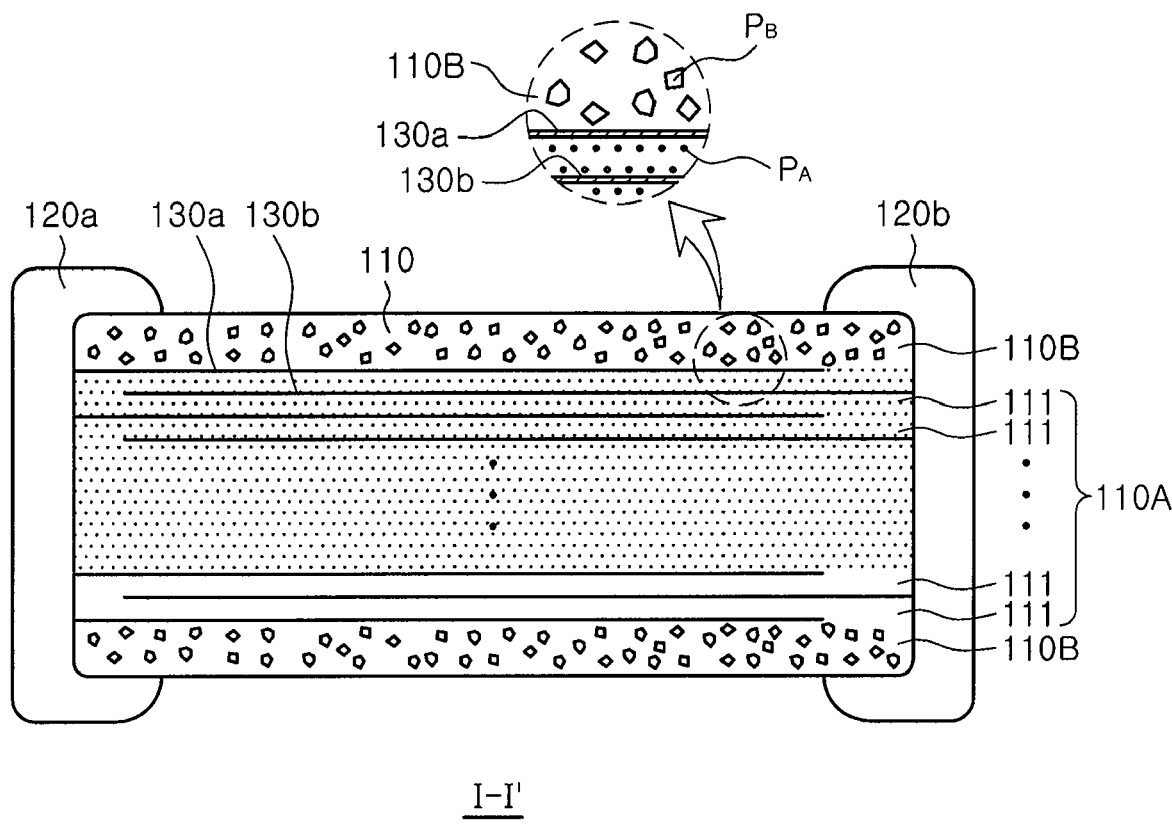
FIG. 2 is a schematic cross-sectional view taken along line I-I' of FIG. 1, illustrating the multilayer ceramic capacitor.

FIG. 1 is a schematic perspective view illustrating a multilayer ceramic capacitor according to an exemplary embodiment of the present invention. FIG. 2 is a schematic cross-sectional view taken along line I-I' of FIG. 1, illustrating the multilayer ceramic capacitor.

Referring to FIGS. 1 and 2, a multilayer ceramic capacitor, according to this exemplary embodiment, includes a sintered ceramic body 110, first and second internal electrodes 130a and 130b formed inside the sintered ceramic body 110, and first and second external electrodes 120a and 120b electrically connected to the first and second internal electrodes 130a and 130b.

In FIG. 2, the sintered ceramic body 110 includes a capacitive part 110A, and protective layers 110B formed on the top and bottom surfaces of the capacitive part 110A.

The capacitive part 110A is obtained by laminating a plurality of dielectric layers 111 and the first and second internal electrodes 130a and 130b in an alternating manner. The first and second internal electrodes 130a and 130b are paired as having opposite polarities. These first and second internal electrodes 130a and 130b oppose each other in a lamination direction of the dielectric layers 111, and are electrically insulated from each other by the dielectric layers 111. One set of ends of the first internal electrodes 130a and the other set of ends of the second internal electrodes 130b are exposed in the lamination direction of the dielectric layers 111. The exposed ends of the first and second internal electrodes 130a and 130b are electrically connected to the first and second external electrodes 120a and 120b, respectively.

When a predetermined voltage is applied to the first and second external electrodes 120a and 120b, electric charges are accumulated between the opposing first and second internal electrodes 130a and 130b. Here, the capacitance of the multilayer ceramic capacitor is in proportion to the area of the opposing the first and second internal electrodes 130a and 130b.

A material of the dielectric layers 111 of the capacitive part 110A is not specifically limited provided that it is a ceramic material having a high dielectric constant. For example, the dielectric layers 111 may utilize barium titanate ($BaTiO_3$)-based ceramics, lead complex perovskite-based ceramics, strontium titanate ($SrTiO_3$)-based ceramics or the like.

The first and second internal electrodes 130a and 130b are formed of a conductive metal, for example, Ni or a Ni alloy. The Ni alloy may contain Mn, Cr, Co or Al as well as Ni.

The first and second external electrodes 120a and 120b are formed of a conductive metal, and may contain, for example, copper.

The protective layer 110B may be formed on at least one of the top and bottom surfaces of the capacitive part 110A. The protective layers 110B, when formed on both the top and bottom surfaces of the capacitive part 110A as shown FIG. 2, respectively, have great effect in lowering a crack occurrence rate.

The protective layer 110B is formed of a ceramic material but is not specifically limited provided that the ceramic material has a high dielectric constant. For example, the protective layer 110B may utilize barium titanate ($BaTiO_3$)-based ceramics, lead complex perovskite-based ceramics, strontium titanate ($SrTiO_3$)-based ceramics or the like.

The protective layer 110B contains a plurality of pores $P_B$ having an average pore size of 0.5 μm to 3 μm, and has a porosity of 2% to 10%. The porosity may be defined as the total area of the plurality of pores with relation to the sectional area of the protective layer.

Typically, a thermal expansion coefficient of dielectric layers, formed of a ceramic material, reaches approximately 8 to $9 \times 10^{-6}/°$ C., and internal electrodes, formed of nickel, have a thermal expansion coefficient of approximately $13 \times 10^{-6}/°$ C.

Thermal impact is applied to a multilayer ceramic capacitor during a firing process for manufacturing a multilayer ceramic capacitor or when a multilayer ceramic capacitor is mounted on a printed circuit board. This thermal impact mostly acts on the dielectric layers having a relatively small thermal expansion coefficient. The thermal expansion stress due to the thermal impact has its greatest influence on the interface between the protective layer 110B and the capacitive part 110A.

According to this exemplary embodiment of the present invention, the protective layer 110B contains a plurality of pores $P_B$ having an average pore size of 0.5 μm to 3 μm, and has a porosity of 2% to 10%, thereby reducing a difference in stress occurring at the time of the thermal expansion of the internal electrodes. Accordingly, a crack occurrence rate can be lowered at the interface between the capacitive part 110A and the protective layer 110B.

An average pore size of less than 0.5 μm and a porosity of less than 2% may cause a failure in stress absorption and also cause cracks. An average pore size exceeding 3 μm and a porosity exceeding 10% may act as defects impairing moisture resistance and thus degrading reliability.

The protective layer 110B is formed by sintering a slurry, which is a mixture of ceramic particles, an organic binder and a solvent. The average pore size and porosity of the protective layer 110B may be controlled by controlling the content of the ceramic particles and the kind and amount of organic binder. The ceramic particles constituting the protective layer 110B may have an average particle size of 0.1 μm to 0.3 μm, and the content of the ceramic particles may range from 15% to 40%. Furthermore, the organic binder may be added at 10 vol % with relation to the volume of the ceramic particles.

The capacitive part 110A also has a plurality of pores $P_A$ therein, and the porosity thereof may be 1% or less.

The protective layer 110B may be thicker than one dielectric layer 111 of the capacitive part 110A. For example, one dielectric layer 111 of the capacitive part 110A has a thickness or 2 μm or less, and 25 or more of such dielectric layers are laminated, so that the thickness of the capacitive part 110A may range from 50 μm to 2000 μm. In this case, the protective layer 110B may have a thickness of 10 μm to 100 μm.

Hereinafter, a method of manufacturing a multilayer ceramic capacitor, according to an exemplary embodiment of the present invention, will be described.

First, a plurality of ceramic green sheets, which are to be laminated in a capacitance part, are prepared. The ceramic green sheets are manufactured by mixing ceramic particles, a binder and a solvent to thereby produce a slurry and making this slurry into sheets having a thickness of a few micrometers by using a doctor blade method.

An internal electrode paste (i.e., a paste for the formation of an internal electrode) is applied on the surfaces of the ceramic green sheets to thereby form first and second internal electrode patterns. The first and second internal electrode patterns may be formed by using a screen printing method. The internal electrode paste is obtained by dispersing powder of Ni or a Ni alloy in an organic binder or an organic solvent and making it into a paste type. The Ni alloy may contain Mn, Cr, Co or Al as well as Ni.

The utilized organic binder may be one that is known in the art. For example, the organic binder may utilize, but not be limited to, a binder such as a cellulose-based resin, an epoxy-based resin, an aryl resin, an acryl resin, a phenol-formaldehyde resin, an unsaturated polyester resin, a polycarbonate resin, a polyamide resin, a polyimide resin, an alkyde resin, a rosin ester or the like.

The utilized organic solvent may also be one that is known in the art. For example, the organic solvent may utilize, but not be limited to, a solvent such as butyl carbitol, butyl carbitol acetate, turpentine, a-terpineol, ethyl cellosolve, butyl phthalate or the like.

Thereafter, the ceramic green sheets provided with the first and second internal electrode patterns are laminated and pressurized in the lamination direction. Thus, the laminated ceramic green sheets and the internal electrode paste are pressed with each other. In such a manner, a capacitive part, including the alternately laminated ceramic green sheets and internal electrode paste, is manufactured.

Subsequently, a plurality of ceramic green sheets, which are to be laminated on the top and bottom surfaces of the capacitive part, are prepared. The ceramic green sheets are manufactured by mixing ceramic particles, a binder and a solvent to thereby produce a slurry and making this slurry into sheets having a thickness of a few micrometers by using a doctor blade method.

Thereafter, the ceramic green sheets are laminated on the capacitive part to thereby form a protective layer. The pore size and porosity of the protective layer may be controlled by controlling the content of the ceramic particles and the kind and amount of organic binder. The ceramic particles may have an average particle size of 0.1 μm to 0.3 μm, and the content of the ceramic particles may range from 15% to 40%.

Thereafter, a resultant ceramic laminate is cut into chips in units of one capacitor. At this time, the cutting is performed such that one set of ends of the first internal electrode patterns and the other set of ends of the second internal electrode patterns are exposed to the side surfaces thereof.

Thereafter, the laminate chip is fired at a temperature of 1200° C. for example, thereby manufacturing a sintered ceramic body.

At this time, the protective layer contains a plurality of pores having an average particle size of 0.5 μm to 3 μm and has a porosity of 2% to 10%. This protective layer can reduce a stress difference occurring at the time of the thermal expansion of the internal electrodes.

Thereafter, first and second external electrodes are formed to cover the side surfaces of the sintered ceramic body and be electrically connected to the first and second internal electrodes exposed to the side surfaces of the sintered ceramic body.

Subsequently, the surface of those external electrodes may be plated with nickel, tin or the like.

Multilayer ceramic capacitors were manufactured under conditions shown in Table 1 below. After the manufactured multilayer ceramic capacitors were subjected to thermal impact testing (dipping in a lead pot at 320 degrees Celsius for two seconds), the occurrence of cracks was evaluated using a microscope of 50 to 1000 magnification.

TABLE 1

|  | Porosity (%) of protective layer | Pore size (μm) of protective layer | Crack occurrence rate |
| --- | --- | --- | --- |
| Comparative example 1 | 1.3 | 0.3 | 6/100 |
| Inventive example 1 | 2.1 | 0.5 | 1/100 |
| Inventive example 2 | 4.5 | 0.7 | 0/100 |
| Inventive example 3 | 6.2 | 0.8 | 0/100 |
| Inventive example 4 | 6.8 | 1.5 | 0/100 |
| Inventive example 5 | 7.5 | 2.3 | 0/100 |
| Inventive example 6 | 7.8 | 2.7 | 0/100 |
| Inventive example 7 | 9.7 | 2.9 | 1/100 |
| Comparative example 2 | 10.3 | 4.1 | 5/100 |
| Comparative example 3 | 10.7 | 5.3 | 7/100 |
| Comparative example 4 | 13.6 | 5.8 | 13/100 |
| Comparative example 5 | 15.8 | 5.9 | 20/100 |

Referring to Table 1, crack occurrence rates are high in comparative example 1 associated with a protective layer having an average pore size of less than 0.5 μm and a porosity of less than 2%, and in the comparative examples 2 to 5 associated with an average pore size exceeding 3 μm and a porosity of 10%. In contrast, crack occurrence rates are low in the inventive examples 1 to 3 in which an average pore size ranges from 0.5 μm to 3 μm and a porosity ranges from 2% to 10%.

As set forth above, according to exemplary embodiments of the invention, the multilayer ceramic capacitor includes a protective layer containing a plurality of pores having an average pore size of 0.5 μm to 3 μm and having a porosity of 2% to 10%. Accordingly, a stress difference occurring at the time of the thermal expansion of internal electrodes can be reduced.

Furthermore, the multilayer ceramic capacitor, used while mounted on a wiring board, can lower a crack occurrence rate by reducing thermal impact and shear stress which are applied thereto when the multilayer ceramic capacitor is mounted by soldering or when the wiring board mounted with the multilayer ceramic capacitor undergoes cutting.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
   a capacitive part including a plurality of dielectric layers and first and second internal electrodes that are laminated in an alternating manner, wherein one set of ends of the first internal electrodes and the other set of ends of the second internal electrodes are exposed in a lamination direction in which the dielectric layers are laminated;
   a protective layer formed on at least one of top and bottom surfaces of the capacitive part, including a plurality of pores having an average pore size of 0.5 μm to 3 μm, and having a porosity of 2% to 10%; and
   first and second external electrodes electrically connected to the first and second internal electrodes exposed in the lamination direction of the dielectric layers.

2. The multilayer ceramic capacitor of claim 1, wherein the protective layer includes barium titanate ($BaTiO_3$)-based ceramic particles, lead complex perovskite-based ceramic particles, or strontium titanate ($SrTiO_3$)-based ceramic particles.

3. The multilayer ceramic capacitor of claim 1, wherein the protective layer includes ceramic particles having an average particle size of 0.1 μm to 0.3 μm.

4. The multilayer ceramic capacitor of claim 1, wherein the capacitive part has a porosity of 1% or less.

5. The multilayer ceramic capacitor of claim 1, wherein the capacitive part has a thickness of 50 μm to 2000 μm, and the protective layer has a thickness of 10 μm to 100 μm.

* * * * *

UNITED STATES PATENT AND TRADEMARK OFFICE
CERTIFICATE OF CORRECTION

PATENT NO. : 8,390,983 B2
APPLICATION NO. : 12/766161
DATED : March 5, 2013
INVENTOR(S) : Ji Hun Jeong et al.

Page 1 of 1

It is certified that error appears in the above-identified patent and that said Letters Patent is hereby corrected as shown below:

On the title page, item "(73) Assignee", change

"Samsung Electronics Co., Ltd., Gyeonggi-do (KR)" to

--Samsung Electro-Mechanics Co., Ltd. Suwon, Gyunggi-do (KR)--.

Signed and Sealed this
Thirty-first Day of December, 2013

Margaret A. Focarino
*Commissioner for Patents of the United States Patent and Trademark Office*